United States Patent [19]

Takehiro et al.

[11] Patent Number: 5,274,467
[45] Date of Patent: Dec. 28, 1993

[54] FACSIMILE APPARATUS CAPABLE OF DESIRED PROCESSINGS DEPENDENT ON TERMINAL NUMBER OF CALLING PARTY

[75] Inventors: Hidemi Takehiro; Yoshiro Nakano; Hisashi Ide; Keiji Motooka, all of Higashihiroshima, Japan

[73] Assignee: Sharp Kabushiki Kaisha, Osaka, Japan

[21] Appl. No.: 752,007

[22] Filed: Aug. 29, 1991

[30] Foreign Application Priority Data

| Aug. 31, 1990 | [JP] | Japan | 2-231097 |
| Sep. 6, 1990 | [JP] | Japan | 2-238314 |
| Apr. 17, 1991 | [JP] | Japan | 3-85515 |

[51] Int. Cl.$^5$ .................................... H04N 1/32
[52] U.S. Cl. ................................ 358/440; 358/402
[58] Field of Search ............... 358/402, 440, 441, 407, 358/434–

[56] References Cited

U.S. PATENT DOCUMENTS

| 4,207,598 | 6/1980 | Reich et al. | 358/407 |
| 4,524,393 | 6/1985 | Ohzeki | 358/257 |
| 4,994,926 | 2/1991 | Gordon et al. | 358/436 |
| 5,016,115 | 5/1991 | Calkins | 358/402 |
| 5,168,376 | 12/1992 | Motohama | 358/402 |

FOREIGN PATENT DOCUMENTS

| 0226756 | 1/1987 | European Pat. Off. |
| 1-311757 | 12/1989 | Japan |
| 2-35871 | 2/1990 | Japan |
| 2-44853 | 2/1990 | Japan |

Primary Examiner—Stephen Brinich

[57] ABSTRACT

A facsimile apparatus includes a facsimile communication control unit, a terminal number comparing unit connected to said facsimile communication control unit, and a terminal number memory connected to the terminal number comparing unit. The terminal number of a facsimile apparatus of the other party is stored in the terminal number memory. When signals are received by the facsimile apparatus, the terminal number of the other party transmitted in accordance with a protocol is detected by the facsimile communication control unit, and the terminal number comparing unit compares the detected number and the terminal number stored in the terminal number memory. When both numbers match with each other, the received information is printed, stored in a prescribed memory area or subjected to other processing dependent on the number and the associated process stored in the terminal number memory.

7 Claims, 9 Drawing Sheets

FIG. 2A
(NORMAL TRANSMISSION/RECEPTION)
CALLING PARTY — CALLED PARTY
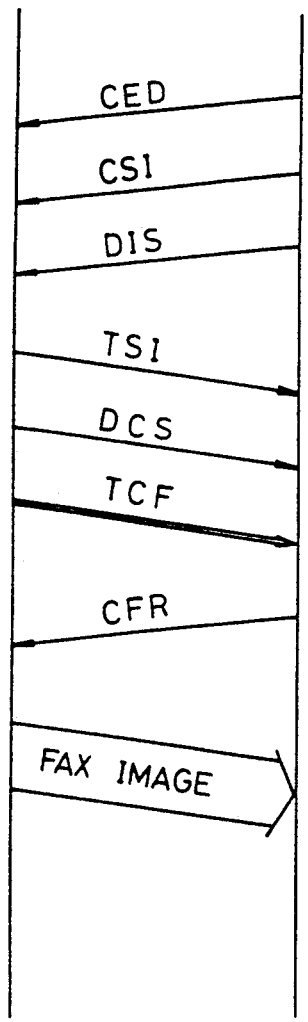
FIG. 2B
(TRANSMISSION/RECEPTION BY POLLING)
CALLING PARTY — CALLED PARTY
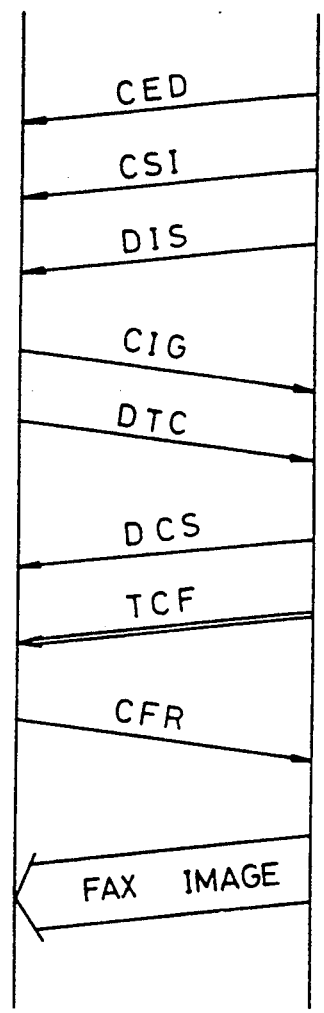
FIG. 4
| SECRET RETREIVAL SET/NOT SET | TRANSFER SET/NOT SET | TERMINAL No. OF TRANSFER DESTINATION | FAX IMAGE DATA |
|---|---|---|---|

(PROCEDURE INTERRUPTION FROM RECEIVING SIDE)

(PROCEDURE INTERRUPTION FROM TRANSMITTING SIDE)

FACSIMILE APPARATUS CAPABLE OF DESIRED PROCESSINGS DEPENDENT ON TERMINAL NUMBER OF CALLING PARTY

BACKGROUND OF THE INVENTION

1. Field of the Invention

The present invention relates to a facsimile apparatus and, more specifically, to a facsimile apparatus which effects desired processing of received facsimiles dependent on the calling parties.

2. Description of the Background Art

Generally, a facsimile apparatus transmits and receives control data and image data in accordance with a facsimile communication procedure. The facsimile communication procedure includes the step of receiving terminal number of the calling party's apparatus. The terminal number is used to identify each terminal. Generally, a user's number (telephone number) of an analogue or digital circuit is used. For example, in the facsimile communication procedure defined in T30 (document facsimile transmitting procedure in general telephone exchange circuit) of CCITT (International Telegraph and Telephone Consulting Committee) recommendation, terminal number is received by the steps of CSI (called subscriber identification), TSI (transmitting subscriber identification) and CIG (calling subscriber identification).

A facsimile apparatus which can inform the user of the calling party when the terminal number of the calling party is received by the above mentioned signals, by displaying the terminal number on a display such as a LCD has been developed.

However, if a user is waiting for a facsimile from a specific party, he cannot confirm whether a received facsimile is from the specific party or not until he acknowledges the content of the received facsimile, unless every time he checks the terminal number of the calling party displayed on the facsimile apparatus. In addition, most of the facsimile apparatuses are used in an automatic response mode in which communication is started automatically in response to a call. Therefore, the user of the facsimile apparatus is generally not present near the facsimile apparatus at the time of receptions. Therefore, it was very difficult to check the terminal number of the calling party by the above described conventional facsimile apparatus.

The received facsimile documents may include urgent documents, confidential documents, nuisance documents wasting recording paper and so on. It takes much time and labor to classify the received facsimile documents.

Further, it was difficult for a user to immediately acknowledge a communication from a specific party and to start conversation with the party unless the user stays near the facsimile apparatus during communication using the facsimile apparatus.

In addition, recently, facsimile apparatuses contained in a cordless telephone have come to be commercially available. The above described problems are also experienced in such apparatuses.

SUMMARY OF THE INVENTION

Therefore, an object of the present invention is to enable processing of information of received facsimile from a specific calling party in a desired state in a facsimile apparatus.

Another object of the present invention is to keep secret the received content in a facsimile apparatus.

A further object of the present invention is to improve efficiency in information transmission in a facsimile apparatus.

A further object of the present invention is to enable switching to conversation mode during facsimile communication with a specific calling party.

A still further object of the present invention is to enable processing of information of received facsimile in from a specific party in a desired state, in a facsimile apparatus including a cordless telephone.

The above described objects of the present invention can be attained by a facsimile apparatus of the present invention including the following components. Namely, a facsimile apparatus for transmitting/receiving image signals and control signals, including terminal number of a facsimile apparatus of a calling party, to and from the facsimile apparatus of the other party connected through a telephone circuit includes: a memory for storing a terminal number of the facsimile apparatus of the other party associated with a prescribed processing condition; a terminal number identifying apparatus for identifying the terminal number of the other party when the facsimile apparatus receives a reception signal; a detector comparing a terminal number identified by the terminal number identifying apparatus with the terminal number stored in the memory and for detecting matching therebetween; and received information processing portion for processing, when a match is detected, the received information included in the received signal in accordance with the prescribed processing condition.

Since the received information is processed in accordance with the processing condition, the received information can be processed in the desired manner by previously determining the processing conditions. Consequently, information of the received facsimile from a specific party can be processed in a desired state in the facsimile apparatus.

Preferably, the information processing portion includes a printing apparatus. Further, the facsimile apparatus includes an operator specifying apparatus for specifying the operator of the facsimile apparatus, and the printer can be used only by the operator specified by the operator specifying apparatus. Since only a specified person can obtain the received information by operating the printer of the facsimile apparatus, the received content can be kept secret in the facsimile apparatus.

In accordance with another aspect of the present invention, the facsimile apparatus includes a master apparatus connected to a telephone circuit for transmitting and receiving audio signals and image signals with facsimile apparatus of another party through the telephone circuit, and a branch apparatus connected to the master apparatus in wireless manner for transmitting and receiving audio signals with the master apparatus and with the facsimile apparatus of the other party through the telephone circuit. The master apparatus further includes a memory for storing a terminal number of the facsimile apparatus of the other party, a terminal number detector for detecting the terminal number of the other party transmitted in accordance with a predetermined facsimile communication procedure, a match detector comparing the terminal number stored in the memory with the terminal number of the other party detected by the terminal number detector and for outputting a match signal when they match with each other, and a transmitter for transmitting a driving designating signal to the branch apparatus in response to the match detecting signal. The branch apparatus includes an alarm, and a driver for driving the alarm in response to the driving signal.

In a facsimile apparatus including a cordless telephone having a master apparatus and a branch apparatus, when the number of the facsimile apparatus of the other party matches with the number in the memory, a driving signal is transmitted to the branch apparatus, and when there is a communication from a specific facsimile apparatus to the branch apparatus, it is informed by alarm. Consequently, a communication from a specific facsimile apparatus can be acknowledged by the branch side, in a facsimile apparatus including a cordless telephone.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2A shows facsimile communication procedure in a normal transmission/reception.

FIG. 2B shows facsimile communication procedure at a time of polling.

FIG. 4 is a schematic diagram showing one example of a structure of image data stored in an image data storing portion.

DESCRIPTION OF THE PREFERRED EMBODIMENTS (1) First embodiment

One embodiment of the facsimile apparatus in accordance with the present invention will be described with reference to the figures.

Figure 1:
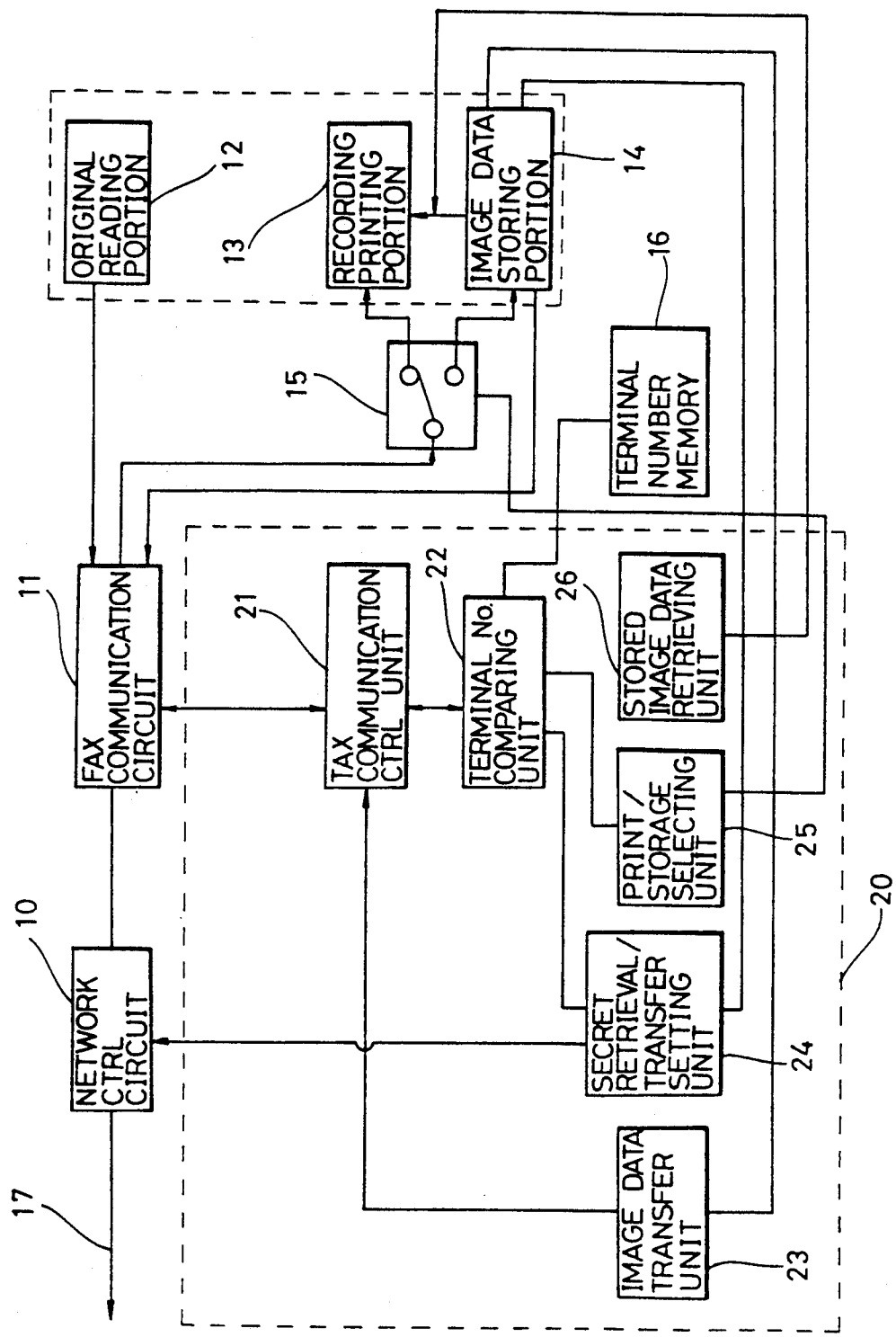
FIG. 1 is a block diagram showing main portions of a facsimile apparatus in accordance with a first embodiment of the present invention.

FIG. 1 is a block diagram showing the structure of the facsimile apparatus in accordance with the present invention. Briefly stated, the facsimile apparatus includes a facsimile communication circuit 11 for carrying out communication protocol related to transmission/reception of facsimile, compression or extension of image data, and modulation/demodulation; an original reading portion 12 for converting the original to electric signals and for outputting the same to the facsimile communication circuit 11; a recording paper printing portion 13; an image data storing portion 14 formed of an IC, a magnetic memory or the like; a switching portion 15 for transmitting outputs from the facsimile communication circuit 11 to the recording paper printing portion 13 or to the image data storing portion 14; a terminal number memory 16 in which terminal numbers of prescribed facsimile apparatuses are registered, and a control portion 20 for controlling these portions. Referring to FIG. 1, a network control circuit 2 is connected to a telephone circuit 17 connected to the terminal of the other party. The network control circuit 10 includes a hook switch or the like, detects holding, releasing of the telephone circuit 17, dialing and reception and provides connection with other circuits. The control portion 20 includes facsimile communication controlling unit 21, terminal number comparing unit 22, image data transferring unit 23, a secret retrieval/transfer setting unit 24, a printing/storing selecting unit 25, and a stored image data retrieving unit 26.

The facsimile communication circuit 11 and the secret retrieval/transfer setting unit 25 are connected to the circuit 17 through the network control circuit 10.

In the facsimile apparatus structured as described above, when image data such as images and documents are to be transmitted, the image data are read by the original reading portion 12 and converted into electric signals to be output to the facsimile communication circuit 11. The image data are compressed, modulated or subjected to other necessary processings and output to the circuit 17 through the network control circuit 10 from the facsimile communication circuit 11 under the control of the facsimile communication control unit 21.

Image data received by the circuit 17 is input to the facsimile communication circuit 11 through the network control circuit 10, demodulated or expanded for output, and thereafter output to the recording paper printing portion 13 or to the image data storing portion 14 dependent on the setting in the switching portion 15. The image data stored in the image data storing portion 14 are output to the recording paper printing portion 13 as needed, under the control of the stored data retrieving unit 26, by operating an operating portion, not shown.

FIG. 2A is a schematic diagram showing general facsimile communication procedure. The procedure of facsimile communication includes the steps of receiving signals of CED (called station identification), CSI (called subscriber identification), DIS (digital identification signal), TSI (transmitting subscriber identification), DCS (digital command signal), TCF (training check), CFR (confirmation to receive), and image data. The procedure is defined in CCITT recommendation T30. The terminal number of the other party can be recognized by the facsimile apparatus of the receiving party, by receiving the TSI signal of the procedure.

FIG. 2B shows communication procedure at a time of so called polling for requesting facsimile transmission from the other party.

In the above described facsimile apparatus, the received terminal number of the other party is transmitted from facsimile communication circuit 11 to facsimile communication control unit 21 in accordance with the communication procedure shown in FIG. 2A, and then it is transmitted to terminal number comparing unit 22. It is compared with the terminal number stored in advance in terminal number memory 16.

Figure 3:
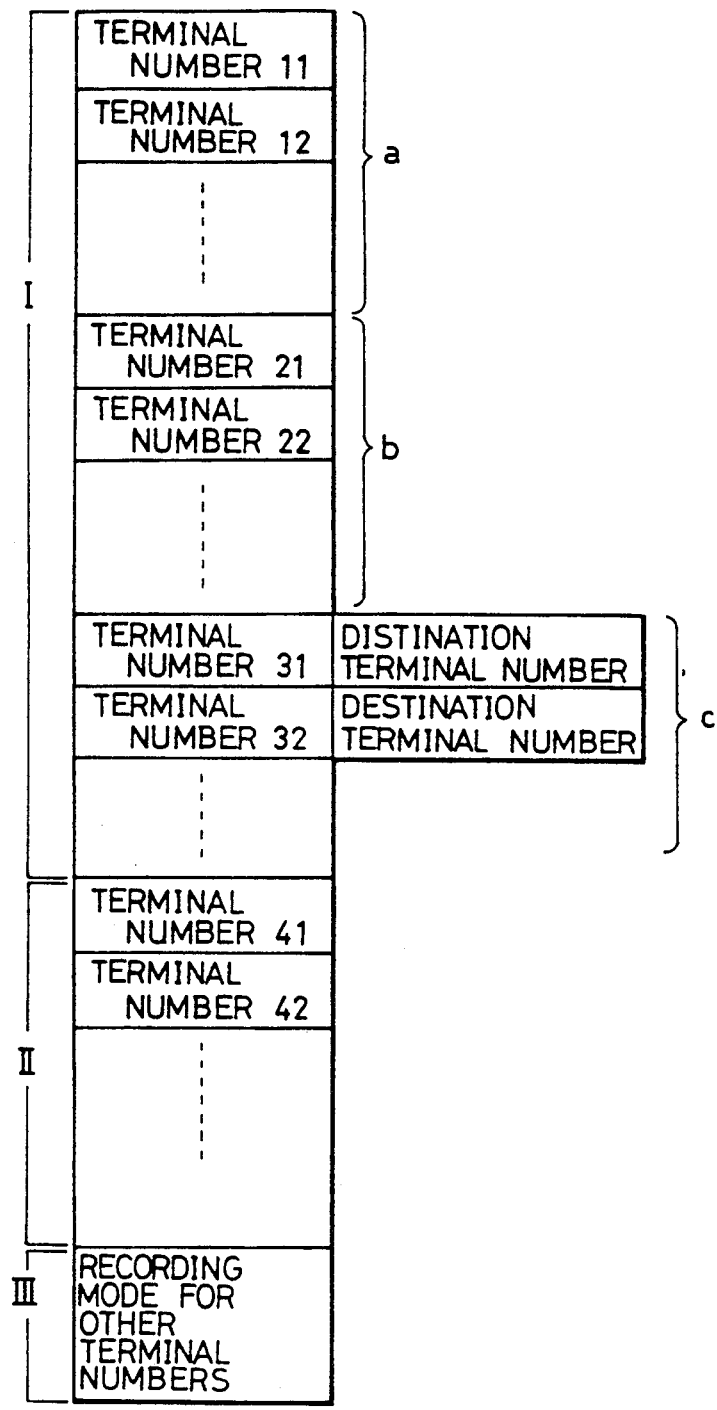
FIG. 3 is a schematic diagram showing a memory storing terminal numbers of the facsimile apparatuses of calling parties.

FIG. 3 is a schematic diagram showing an example of the state of storage in the terminal number memory 16.

The reference character I denotes an area in which terminal numbers of the caller when image data are to be stored are stored. II denotes an area storing terminal numbers of the caller when image data are to be printed on recording paper. Reference character III denotes an area for storing, when image data from a terminal which is not set in the areas I and II is received, whether or not the received image data should be stored or to be printed.

The area for storing terminal numbers for setting image data storage I is classified in accordance with the setting of registration, for example, terminal numbers 21~ are allotted to terminal number area b for setting secret retrieval, terminal numbers 31~ are allotted to terminal number area c for setting image data transfer, and terminal numbers 11~ are allotted to the terminal number area a in which secret retrieval and transfer setting are not carried out. In addition, terminal numbers of the destinations are added to the terminal numbers for setting image data transfer.

As described above, in the terminal number comparing unit 22, the stored terminal number and received terminal number at the terminal number memory 16 are compared with each other. It is determined whether the received image data is to be printed out by the recording paper printing portion 13 or to be stored in the image data storing portion 14. The signal of determination is output to printing/recording selecting unit 25. In response to this signal, the printing/storage selecting unit 25 outputs a switch control signal to switching portion 15, and image data output from facsimile communication circuit 11 is transmitted to recording paper printing portion 13 or image data recording portion 14 through switching portion 15.

In terminal number comparing unit 22, whether or not secret retrieval setting or image data transfer setting is done for the received terminal number is determined, and the signal of this information is output to secret retrieval/transfer setting unit 24. The secret retrieval/transfer setting unit 24 outputs an information setting signal to image data storing portion 14 so that image data transmitted to image data storing portion 14 are set with the information added thereto. Therefore, when image data is stored in image data storing portion 14, information of classification shown in FIG. 3 is also stored in addition to the image data.

FIG. 4 is a schematic diagram showing an example of image data structure stored in image data storing portion 14. As shown in FIG. 4, information indicating whether secret retrieval and transfer is requested, and if transfer is requested, information of the destination terminal number is added to a certain image data. Setting and addition of such information is done by the secret retrieval/transfer setting unit 24.

The image data stored in the image data storing portion 14 in the above described manner is taken out in accordance with the information added to the image data, after the end of the facsimile communication procedure. For example, transfer of image data has been set, a signal is automatically output from image data storing portion 14 to image data transfer unit 23, and image data transfer unit 23 outputs a signal to network control circuit 10. The network control circuit 10 closes the telephone circuit by receiving the signal and calls the destination terminal number. When the call is finished, facsimile communication controlling unit 21 is instructed to start transmission and image data are output from image data storing portion 14 to facsimile communication circuit 11. The facsimile communication circuit 11 outputs image data to the destination under the control of facsimile communication control unit 21. Namely, image data, the transfer of which has been set, is automatically sent to the desired destination after the reception of the facsimile.

As described above, image data stored in image data storing portion 14 is fed to recording paper printing portion 13 to be printed under the control of stored data retrieval unit 26 by operating an operating portion, now shown. If secret retrieval is set for the image data, verification of the retrieving operator is done by input of ID code or ID card or by other method with respect to retrieval of the image data.

As described above, in the facsimile apparatus in accordance with the first embodiment of the present invention, whether or not the received image data is to be printed out on a sheet of recording paper or to be stored temporarily in image data storing portion 14, or whether the received image data should be transferred or to be retrieved secretly can be set and registered in advance in accordance with the terminal numbers of the calling party. Therefore, printing, storage, transfer and the like can be automatically carried out after the reception of the facsimile in accordance with the registered information. Therefore, it is not necessary to classify the image data, and hence, reception of a facsimile from a specific party can be immediately and easily checked even if the operator is not always monitoring the facsimile apparatus. For example, when urgent image data and image data which is necessary and waited for only are set to be recorded on the recording paper, such image data can be found earlier. As to other image data, they can be retrieved from image data storing portion 14 while determining whether or not the data is necessary.

By setting secret retrieval, image data and the like which should be kept secret can be retrieved only by the specified operator. Therefore, the received content can be kept secret.

In addition, since image data can be transferred, image data can be soon received even if the user is out.

Although CCITT recommendation T30 was used as the facsimile communication procedure in the above described embodiment, the present invention can be applied to other communication systems and other communication procedures such as G4 system.

Although received image data were transmitted to the printing portion 13 or to image data storing portion 14 in the above described embodiment, the image data can be output to a medium capable of displaying image data such as an LCD, or to a medium which can temporarily store the data.

(2) Second embodiment

A second embodiment of the present invention will be described with reference to the figures.

Figure 5:
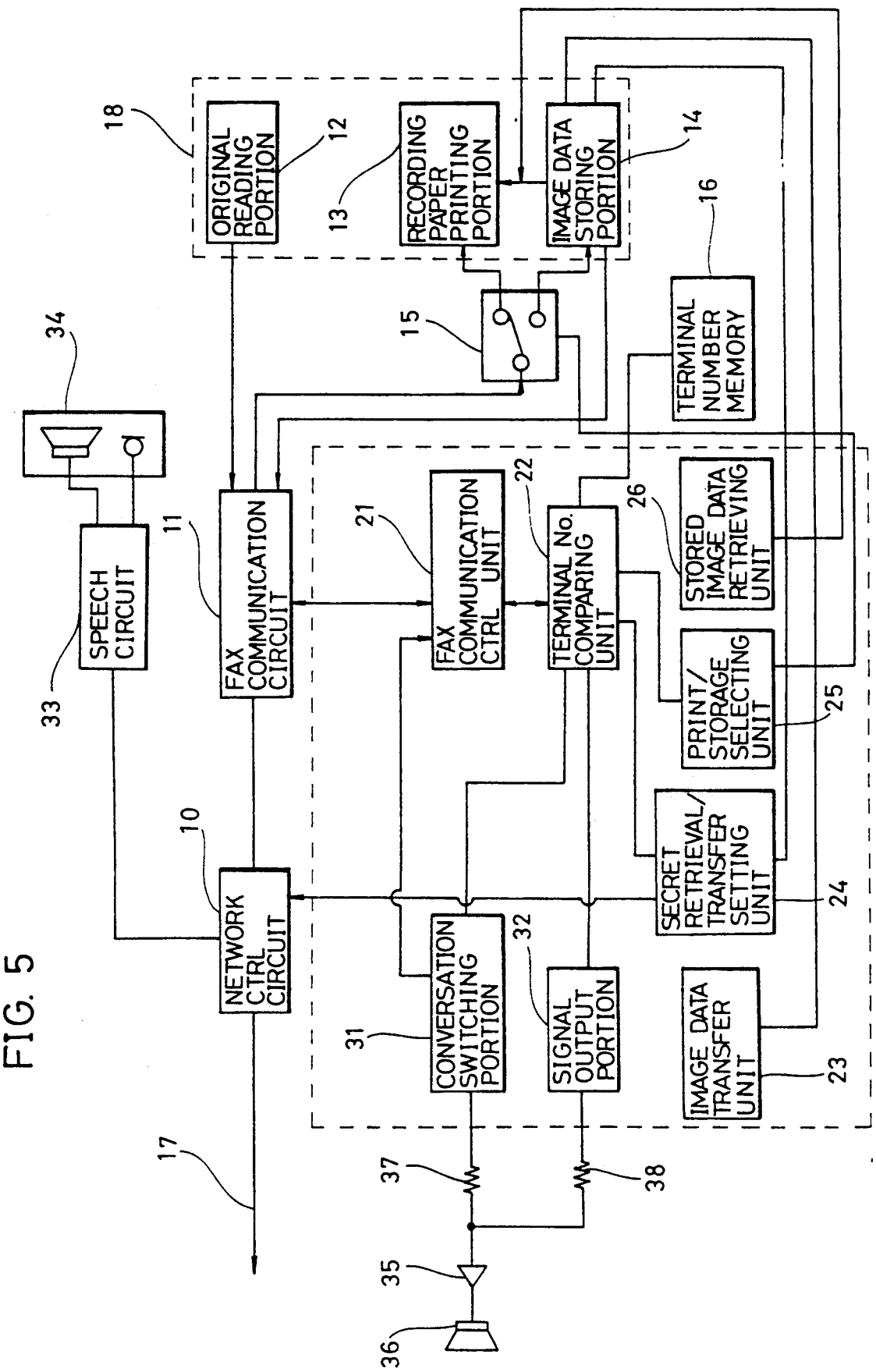
FIG. 5 is a block diagram showing main portions of a facsimile apparatus in accordance with a second embodiment of the present invention.

FIG. 5 is a block diagram showing a second embodiment of the facsimile apparatus in accordance with the present invention. This corresponds to FIG. 1 of the first embodiment. In the second embodiment, a telephone and an alarm are added to the facsimile apparatus of the first embodiment.

Portions different from FIG. 1 only will be described with reference to FIG. 5. A speech circuit 33 for conversation using handset is connected to a network control circuit 10 so as to allow bidirectional conversation. A speaker input terminal and a microphone output terminal of a handset 34 including a speaker and a microphone are connected to speech circuit 33. Terminal number comparing unit 22 compares the terminal number received during the facsimile communication procedure with the terminal number stored in the terminal number memory 16, and when they match with each other, it outputs a match signal to a signal output portion 32 or to conversation switching portion 31. Output from signal output portion 32 is guided through a resistance 38 and through an amplifier 35 to a speaker 36. Output from conversation switching portion 31 is fed to the facsimile communication control unit 21 and to the speaker 36 through resistance 37 and amplifier 35. The amplifier 35 and the speaker 36 serve to give the alarm, which will be described later.

The terminal number comparing unit 22 compares the terminal number input through facsimile communication controlling unit 21 during facsimile communication with the terminal number read from the terminal number memory 16. When both numbers match with each other, it outputs a match signal (a signal indicating that a communication with a specific party is detected) to one of or both of signal outputting portion 32 and conversation switching portion 31, dependent on which area of the terminal number memory 16 the matched number has been stored. When the match signal is applied from the terminal number comparing unit 22 to signal output portion 32 during facsimile communication, the signal output portion 32 outputs, for a prescribed time period, a driving signal for driving speaker 36. The conversation switching portion 31 controls, when the match signal is applied from terminal number comparing unit 22 during facsimile communication, the facsimile communication control unit 21 for carrying out procedure interruption, output a ringing tone, and switches the operation to the conversation state.

The operation of the facsimile apparatus structured as described above when a signal is to be output upon facsimile communication with a specific party, and when the operation is to be switched to conversation will be described in the following.

(A) The operation when a signal is to be output upon facsimile communication with a specific party.

As described in the first embodiment, when the number transmitted from facsimile communication control unit 21 matches with the terminal number stored in the terminal number memory 16 at which a signal is determined to be output, a match signal is transmitted to signal output portion 32. Signal output portion 32 outputs, for a prescribed time period, a driving signal based on the match signal and drives the speaker 36 through amplifier 35. Thus an alarm "peep peep" is given from speaker 36. Instead of driving speaker 36, LEDs and the like may be flickered. During this period, facsimile controlling portion 61, modulating/demodulating circuit 3, facsimile image processing portion and so on carry out similar operation as in a normal facsimile communication. The alarm tone may be output after the end of facsimile communication.

Figure 6A:
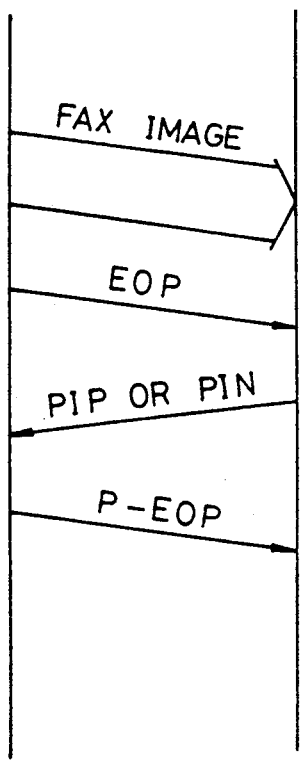
FIGS. 6A and 6B show procedure interrupting process in the second embodiment.
Figure 6B:
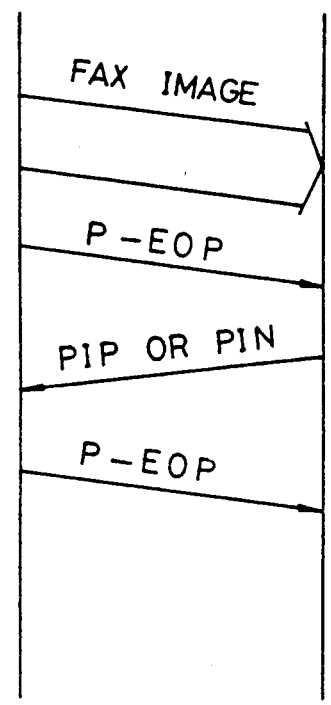

(B) The operation when the operation is to be changed to conversation upon facsimile communication with a specific party In the same manner as described above, the number transmitted from facsimile communication control unit 21 is compared with the terminal number read from the terminal number memory 16 at which the operation is determined to be changed to conversation. If the number transmitted from facsimile communication control unit 21 matches with the terminal number stored in terminal number memory 16 for switching to conversation, not shown, a match signal is transmitted to conversation switching portion 31. The conversation switching portion 31 starts operation in response to the match signal. Namely, a request signal for interrupting the procedure is fed to facsimile communication control unit 21. In response to the request signal, facsimile communication control unit 21 carries out procedure interrupting process, after the transmission/reception of all facsimile images is completed. The procedure interruption is done by transmission/reception of procedure interrupting signal P-EOP, PIP or PIN, as shown in FIGS. 6A and 6B. By this procedure interrupting process, the conversation switching portion 31 sends ringing tone to amplifier 35 and drives speaker 36 for emitting the ringing tone. When the user takes the handset 34 off from the hook in response to the ringing tone, the conversation switching portion 31 stops its operation, since conversation through the handset 34 and telephone circuit 17 is possible through the speech circuit. The facsimile apparatus of the other party is also changed to the conversation state by the procedure interrupting process shown in FIGS. 6A and 6B, and therefore, conversation with the other party is enabled.

In the second embodiment, the facsimile apparatus of the present invention detects reception from telephone circuit 17 by the network control circuit 10 as in the first embodiment, activates facsimile communication control unit 21 and starts facsimile communication automatically. Therefore, when there is a facsimile communication with a specific party, signals can be automatically output and operation can be automatically changed to the conversation, even if the user does not operate the apparatus.

In addition, in the above described embodiment, it is made possible to know that facsimile communication with a specific party is experienced during normal facsimile transmission/reception and transmission/reception at a time of polling. This function may be limited only to the reception of facsimile, for example. If the function is limited in such a manner, the user can be informed of the reception only when a facsimile from a specific party is received.

(3) Third embodiment

A third embodiment of the present invention will be described. In the third embodiment, a cordless telephone is contained in a facsimile apparatus, and a plurality of branch apparatuses are connected thereto. Portions different from the first and second embodiments only are described.

Figure 7:
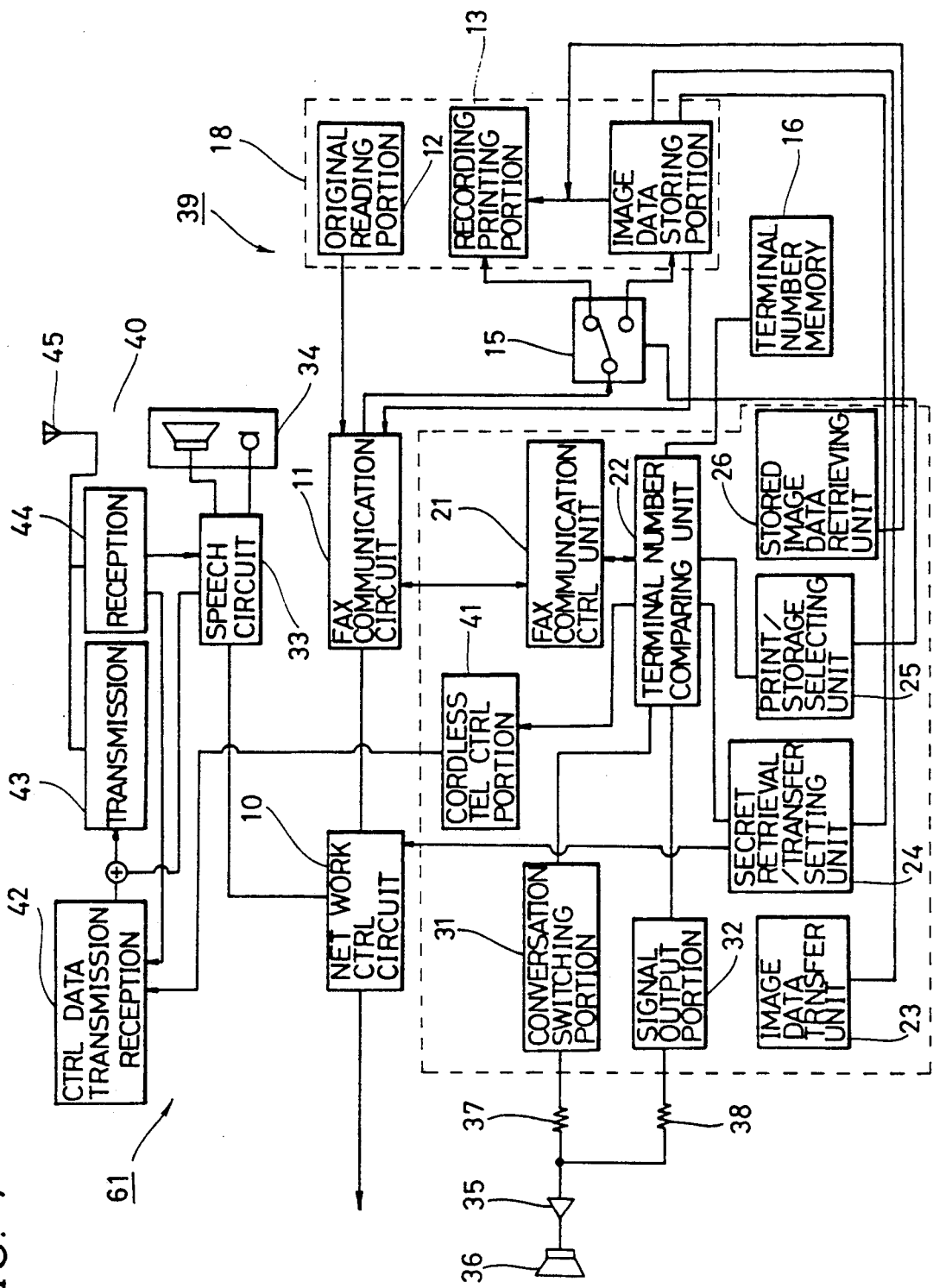
FIG. 7 is a block diagram showing main portions of the facsimile apparatus in accordance with a third embodiment of the present invention.
Figure 8:
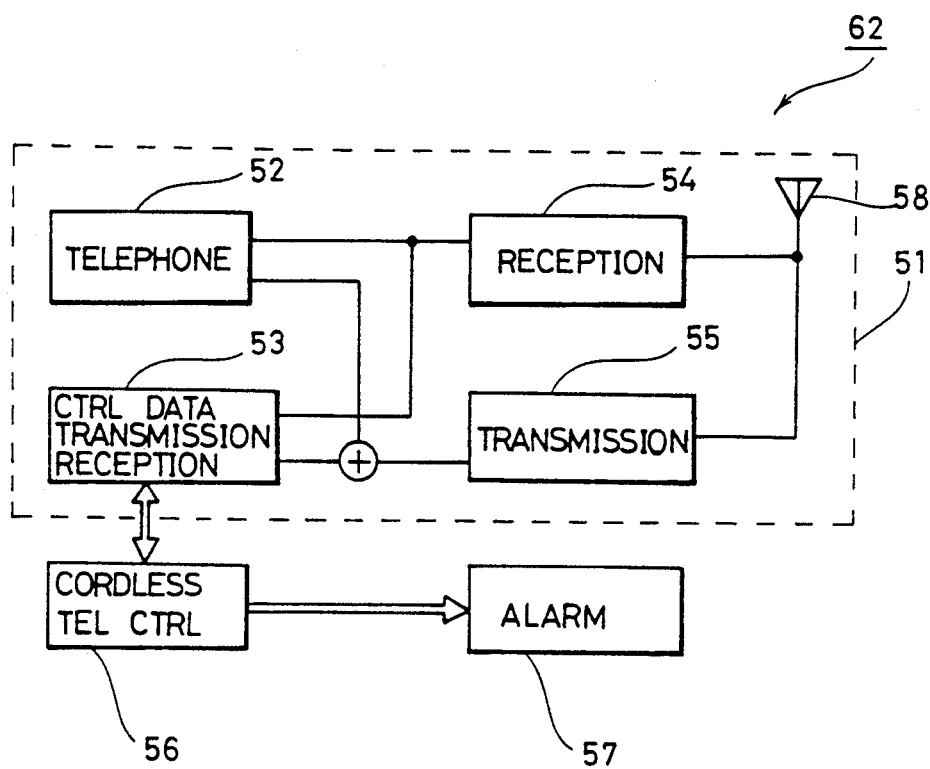
FIG. 8 is a block diagram showing main portions of a branch apparatus of the facsimile apparatus in accordance with the third embodiment of the present invention.

FIGS. 7 and 8 are block diagrams showing basic structure of a facsimile apparatus in accordance with a third embodiment of the present invention. The facsimile apparatus includes a master apparatus 61 shown in FIG. 7 and a branch apparatus shown in FIG. 8. The master apparatus 61 includes a cordless telephone controlling portion 41 and a cordless telephone portion 40 in addition to the components of the second embodiment shown in FIG. 5. The branch apparatus 62 is connected by wireless communication to master apparatus 61 and transmits and receives audio signals (conversation) to and from the master apparatus 61, and to and from the terminal apparatus of the other party through the master apparatus 61 and the telephone circuit 17.

Network control circuit 10 connects telephone circuit 17 to either facsimile portion 39 or cordless telephone portion 40 by switching. Facsimile portion 39 transmits and receives image data. Cordless telephone portion 40 transmits and receives audio signals through telephone circuit 17 and transmits and receives audio signals to and from the branch apparatuses 62. Control portion 20 controls the facsimile portion 39 and cordless telephone portion 40. Terminal numbers, that is, telephone numbers of terminal apparatuses of calling parties are stored in terminal number memory 16, as will be described later. The structure of facsimile portion 39 is the same as that of the second embodiment except cordless telephone controlling portion 41.

Cordless telephone portion 40 includes a speech circuit 33, a control data transmitting and receiving circuit 42, a transmitting circuit 43, a receiving circuit 44 and an antenna 45. The speech circuit 33 is an interface circuit to communicate with other telephone connected through the telephone circuit 17 and with branch apparatus 62 connected in wireless manner (by radiowave). Control data transmitting and receiving circuit 42 ensures channel for wireless connection with branch apparatus 62 and transmits and receives control data to and from branch apparatus 62. Transmitting circuit 43 transmits audio signals from speech circuit 33 and control data from control data transmitting and receiving circuit 42 to branch apparatus 62 through antenna 45. Receiving circuit 44 applies audio signals received through antenna 45 to speech circuit 33, and applies control data to control data transmitting and receiving circuit 42. Cordless telephone controlling portion 41 included in controlling portion 20 controls control data transmitting and receiving circuit 42. Terminal number comparing unit 22 compares telephone number of the other party from facsimile communication control unit 21 with the telephone number stored in terminal number memory 16. When they are the same, it outputs a match signal to cordless telephone controlling portion 41.

Branch apparatus 62 includes a cordless telephone portion 40, a cordless telephone controlling circuit 56 and an alarm unit 57. Cordless telephone portion 40 transmits and receives audio signals and control data to and from cordless telephone portion 40 of the master apparatus 61. Cordless telephone portion controlling circuit 56 controls the cordless telephone portion 51 and alarm unit 57. Alarm unit 57 includes a sound signal source, a light emitting element and the like for informing the user of reception of facsimile or a telephone call.

Cordless telephone portion 51 includes a telephone portion 52, a control data transmitting and receiving circuit 53, a transmitting circuit 55, a receiving circuit 54 and an antenna 58. Telephone portion 52 includes a handset and carries out conversation with cordless telephone portion 40 of master apparatus 61 connected in wireless manner (by radiowave) and with other telephones connected through cordless telephone portion 40 and telephone circuit 17. Control data transmitting and receiving circuit 53 ensures channel for wireless connection with cordless telephone portion 40 and transmits and receives control data to and from cordless telephone portion 40. Transmitting circuit 55 transmits audio signals from telephone portion 52 and control data from control data transmitting and receiving circuit 53 to cordless telephone portion 40 through antenna 58. Receiving circuit 54 applies audio data received through antenna 58 to speech circuit 33, and applies control data to control data transmitting and receiving circuit 53.

Figure 9:
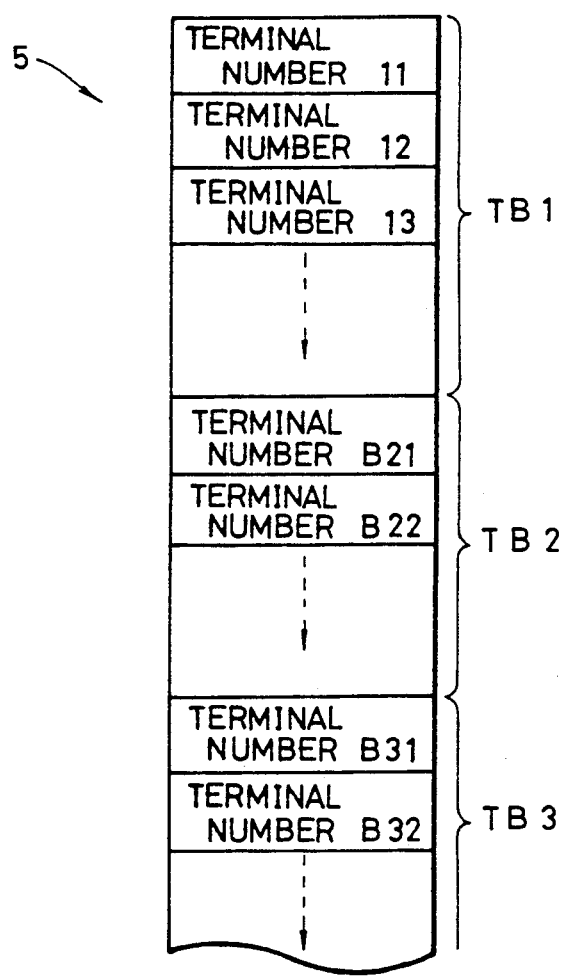
FIG. 9 is a schematic diagram showing the content of terminal number memory in the third embodiment.

FIG. 9 shows portions of the stored content of the terminal number memory 16 which are newly added in the third embodiment. Terminal number memory 16 includes separate memory areas TB1, TB2, TB3, . . . corresponding to a plurality of branch apparatuses 621, 622, 623, . . . (generally denoted by the reference numeral 62). Terminal numbers B11, B12, B13, . . . are stored in separate memory area TB1. In the similar manner, terminal numbers Bij (j = 1, 2, . . . ) are stored in separate area TBi (i = 2, 3, . . . ).

Figure 10:
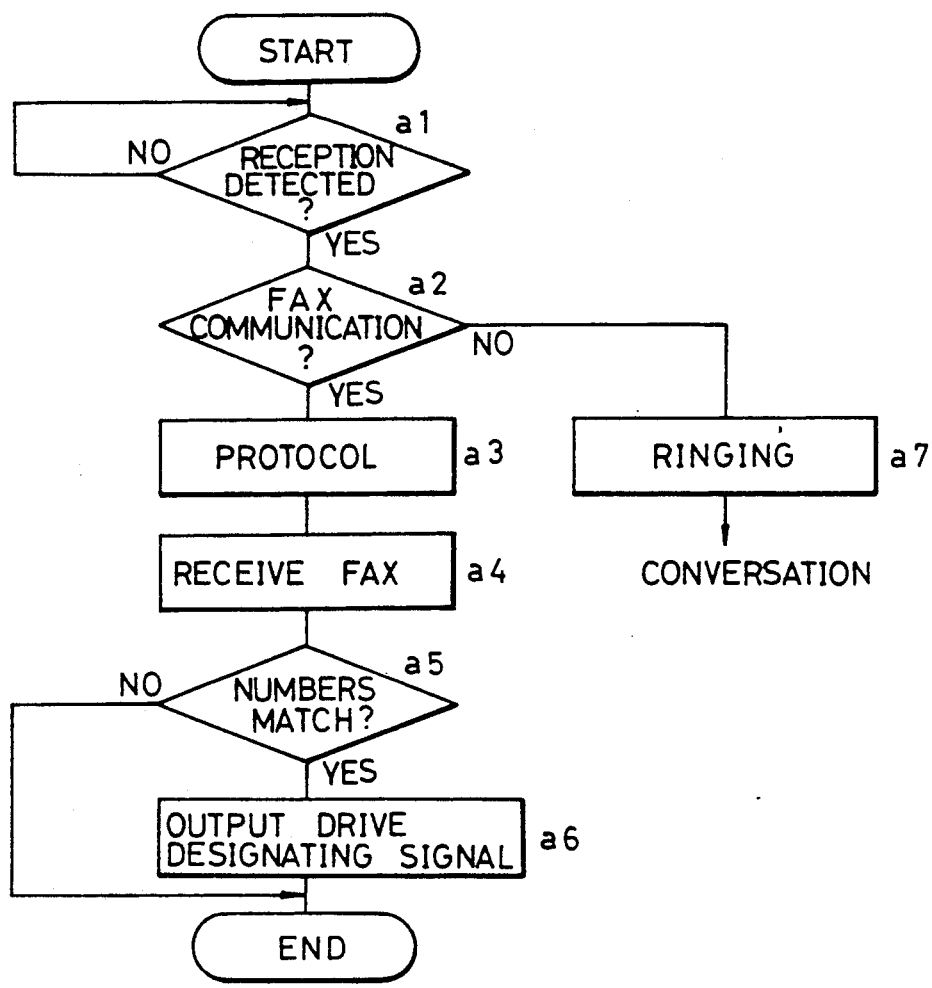
FIG. 10 is a flow chart of the operation of the third embodiment.

FIG. 10 is a flow chart for describing receiving operation of the facsimile apparatus in accordance with the third embodiment shown in FIG. 8. When a reception signal is detected in step a1, the flow proceeds to step a2, and whether it is a facsimile communication or a telephone conversation is determined based on a CNG signal or the like. If it is a facsimile communication, the control proceeds to step a3, and if it is a telephone conversation, it proceeds to step a7.

In step a3, protocol for facsimile communication is carried out.

In step a4, facsimile (image data) is received, and received image data is output to be printed on a recording paper or to be stored in a memory.

In step a5, terminal number stored in terminal number memory 16 is compared with the terminal number of the calling party applied through facsimile communication circuit and facsimile communication control unit 21, in terminal number comparing unit 22. When the numbers match with each other, terminal number comparing unit 22 outputs a match signal to cordless telephone portion controlling portion 41 in step a5. In response to the match signal, cordless telephone portion controlling portion 41 controls control data transmitting and receiving circuit 42, and outputs a driving designating signal to a branch apparatus 62. In the branch apparatus 62 which has received the driving designating signal, alarm unit 57 is driven, and the owner of the branch apparatus 62 acknowledges reception of facsimile by the master apparatus 61.

At the time of comparison of numbers in step a5, the number is compared with all terminal numbers stored in the terminal number memory 16. Therefore, when the terminal number of the calling party matches only with the terminal number B11, for example, driving designating signal is output only to a branch apparatus 621. If terminal number B11 stored in terminal number memory 16 is the same as terminal number B21 and the terminal number of the calling party received matches with both terminal numbers B11 and B21, driving designating signal is output to branch apparatuses 621 and 622, respectively.

The driving designating signal is transmitted through antenna 58, receiving circuit 54, control data transmitting and receiving circuit 53 to cordless telephone portion control circuit 56 in the branch apparatus, and thus alarm unit 57 is driven. Alarm unit 57 includes a sound output apparatus or a display apparatus or other information output apparatus, and accordingly, the owner of the branch apparatus can be informed of the reception of facsimile communication from a specific party.

As described above, in the third embodiment, when facsimile is received by the master apparatus, alarm unit 57 of a branch apparatus is driven, and therefore the owner of the branch apparatus 62 can be informed of the reception of facsimile by the master apparatus. Since terminal numbers of the terminal apparatus of the calling party are separately stored in the terminal number memory 16 for each of the plurality of branch apparatuses, when a facsimile is received, reception of the facsimile is informed only to branch apparatuses owned by users who have registered the terminal number of the terminal apparatus of the calling party. Therefore, efficiency in transmitting information can be much improved.

In the foregoing, description was given on the operation of receiving facsimile. However, a branch apparatus can be called by checking the terminal number of the other party in the similar manner as described above even if a so called polling function in which the other party requests facsimile transmission is being carried out. In this case, the terminal number of the other party is detected based on CIG in accordance with CCITT recommendation T30.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A facsimile apparatus for transmitting and receiving, to and from a facsimile apparatus of an other party connected through a telephone circuit, image signals and control signals including a terminal number of the facsimile apparatus of the other party, comprising:

memory means for storing the terminal number of the facsimile apparatus of the other party together with prescribed processing, dependent on a detected identity of the other party;

terminal number recognizing means for recognizing said terminal number of the other party when said facsimile apparatus receives a receiving signal;

match detecting means for comparing a terminal number recognized by said terminal number recognizing means with a terminal number stored in said memory means for detecting matching therebetween; and received information processing means for processing, when said matching is detected, received information included in said received signals according to said prescribed processing.

2. A facsimile apparatus according to claim 1, wherein said information processing means includes printing means, and said prescribed processing includes printing of said received information by said printing means.

3. A facsimile apparatus according to claim 2, further comprising;

operator specifying means for specifying a specific operator of said facsimile apparatus;

so that only said specific operator can use said printing means.

4. A facsimile apparatus according to claim 1, further comprising information storing means, wherein said prescribed processing includes storing process of said received information in said information storing means.

5. A facsimile apparatus for transmitting and receiving, to and from a facsimile apparatus of the other party connected through a telephone circuit, control signals and image signals including a terminal number of said facsimile apparatus of the other party, comprising:

memory means for storing the terminal number of said facsimile apparatus of the other party;

terminal number recognizing means for recognizing the terminal number of said facsimile apparatus of the other party, when said facsimile apparatus receives said signals;

match detecting means for comparing the terminal number of the other party recognized by said terminal number recognizing means with the terminal number stored in said memory means for detecting matching therebetween;

conversation means for allowing conversation with said facsimile apparatus of the other party; and conversation means connecting means for connecting said telephone circuit to said conversation means when said matching detecting means detects matching, so that control data exchanged with said facsimile apparatus of the other party is automatically enabled after the end of image communication with the facsimile apparatus of the other party.

6. A facsimile apparatus comprising a master apparatus connected to a telephone circuit for transmitting and receiving image signals and audio signals to and from a facsimile apparatus of the other party through said telephone circuit, and a branch apparatus connected to said master apparatus by wireless communication for transmitting and receiving audio signals to and from the master apparatus and to and from a terminal apparatus of the other party through the telephone circuit; wherein said master apparatus includes terminal number storing means for storing a terminal number of the facsimile apparatus of the other party, terminal number detecting means for detecting the terminal number of the other party transmitted in accordance with a predetermined facsimile communication procedure, match detecting means for comparing the terminal number stored in said terminal number storing means with the terminal number of the other party detected by said terminal number detecting means and for outputting a match signal when the terminal numbers match with each other, and transmitting means responsive to said match signal for transmitting a driving designating signal to said branch apparatus; and said branch apparatus includes alarm means, and driving means responsive to said driving designating signal for driving said alarm means.

7. A facsimile apparatus according to claim 6, wherein said branch apparatus includes a plurality of said branch apparatuses, said terminal number storing means includes a plurality of separate storing means corresponding to said plurality of branch apparatuses, said match detecting means compares said stored terminal number of the other party and said detected terminal number of the other party for every separate memory means and outputs a match signal, and said transmitting means transmits the driving designating signal only to a corresponding one of said branch apparatuses in response to said match signal.

* * * * *